United States Patent
Heo et al.

(10) Patent No.: US 8,332,486 B2
(45) Date of Patent: Dec. 11, 2012

(54) APPARATUS AND METHOD FOR MULTIMEDIA FILE STREAMING IN PORTABLE TERMINAL

(75) Inventors: Dong-Kyu Heo, Gyeonggi-do (KR); Dae-Kyu Shin, Suwon-si (KR); Jin-He Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 200 days.

(21) Appl. No.: 12/686,875

(22) Filed: Jan. 13, 2010

(65) Prior Publication Data

US 2010/0180012 A1    Jul. 15, 2010

(30) Foreign Application Priority Data

Jan. 13, 2009    (KR) .................. 10-2009-0002519

(51) Int. Cl.
  *G06F 15/16*    (2006.01)
(52) U.S. Cl. .................. 709/219; 709/231; 375/150
(58) Field of Classification Search .................. 709/219, 709/231; 375/150
  See application file for complete search history.

(56) References Cited

U.S. PATENT DOCUMENTS

| | | | |
|---|---|---|---|
| 6,650,694 B1 * | 11/2003 | Brown et al. .................. | 375/150 |
| 6,829,648 B1 * | 12/2004 | Jones et al. .................. | 709/230 |
| 7,694,078 B2 * | 4/2010 | Setheraman et al. ......... | 711/133 |
| 7,752,325 B1 * | 7/2010 | Yadav et al. .................. | 709/231 |
| 2002/0009134 A1 * | 1/2002 | Fischel et al. .................. | 375/224 |
| 2003/0131076 A1 * | 7/2003 | Nelson et al. .................. | 709/219 |
| 2004/0205166 A1 * | 10/2004 | DeMoney .................. | 709/219 |
| 2005/0223034 A1 * | 10/2005 | Kaneko et al. ............. | 707/104.1 |
| 2005/0289601 A1 * | 12/2005 | Park et al. .................. | 725/54 |
| 2008/0019440 A1 | 1/2008 | Lee et al. | |
| 2008/0177865 A1 | 7/2008 | Heo et al. | |
| 2008/0212431 A1 * | 9/2008 | Nakamura .................. | 369/53.17 |
| 2010/0180012 A1 * | 7/2010 | Heo et al. .................. | 709/219 |
| 2010/0262713 A1 * | 10/2010 | Jones et al. .................. | 709/231 |

FOREIGN PATENT DOCUMENTS

| | | |
|---|---|---|
| KR | 1020070109315 | 11/2007 |
| KR | 100810223 | 2/2008 |

* cited by examiner

*Primary Examiner* — Moustafa M Meky
*Assistant Examiner* — Michael C Lai
(74) *Attorney, Agent, or Firm* — The Farrell Law Firm, P.C.

(57) ABSTRACT

An apparatus and method for multimedia file streaming are provided. In a method for multimedia file streaming in a receiving portable terminal, the method includes determining meta data included in a received packet, generating new meta data having a circular-type media data offset on the basis of the meta data, storing media data included in the packet received in a circular manner according to the media data offset included in the new meta data, and loading the media data stored according to the media data offset included in the new meta data.

8 Claims, 6 Drawing Sheets

APPARATUS AND METHOD FOR MULTIMEDIA FILE STREAMING IN PORTABLE TERMINAL

PRIORITY

This application claims priority under 35 U.S.C. §119(a) to a Korean patent application filed in the Korean Intellectual Property Office on Jan. 13, 2009 and assigned Serial No. 10-2009-0002519, the entire disclosure of which is hereby incorporated by reference.

BACKGROUND OF THE INVENTION

1. Field of the Invention

The present invention relates to an apparatus and method for enabling streaming even if a dedicated player is not used and a small-capacity memory is employed when multimedia streaming is performed between portable terminals.

2. Description of the Related Art

With the widespread use of portable terminals, with short-range communication capabilities such as Bluetooth® (hereinafter "Bluetooth") or any other local area communication protocol, has become increasingly popular. In addition, not only headsets using Bluetooth, but also file transfer functions using Bluetooth, such as MPEG layer-3 (MP3)/multimedia file contents, business cards, phonebooks, etc., are being used between the portable terminals.

However, when a streaming service of multimedia file contents is provided between portable terminals, an overload may exist in file operations and data duplication during streaming between a server and a terminal. Further, due to its complex structure and dependency of the contents on a terminal-specific player, streaming service has not yet been commercialized.

In recent years, a technique for streaming multimedia file contents stored on a file-by-file basis using Bluetooth has been proposed (see US Patent Publication No: US20080019440), and a technique for streaming motion pictures between portable terminals in the same decoding environment has also been proposed (see US Patent Publication No: US20080177865)

When a communication service provider charges a high subscription fee for the use of the streaming service, it is not appropriate to use existing protocols (i.e., a Real-time Transport Protocol (RTP) and a Session Initiation Protocol (SIP)) for the streaming service between the portable terminals due to structural complexity, ineffectiveness, and functional limitations of the portable terminals.

In the US Patent Publication No: US20080019440, a method for streaming between terminals using a file-based communication scheme directly maps a file pointer of a virtual file in a terminal's player, and thus streaming cannot be performed by a conventional commercialized player. In addition, in the US Patent Publication No: US20080177865, two terminals must share the same decoding environment and the same player, and thus streaming cannot be performed by the presently commercialized player.

Accordingly, there is a need for an apparatus and method capable of streaming a multimedia file between terminals by using a minimum memory capacity while overcoming structural complexity and ineffectiveness without being restricted by a terminal-specific player.

SUMMARY OF THE INVENTION

An aspect of the present invention is to solve at least the above-mentioned problems and/or disadvantages and to provide at least the advantages described below. Accordingly, an aspect of the present invention is to provide an apparatus and method for multimedia file streaming in a portable terminal.

Another aspect of the present invention is to provide an apparatus and method for providing a streaming service by using a minimum memory capacity while overcoming structural complexity and ineffectiveness without being restricted by a terminal-specific player, similarly to a streaming service provided using a server.

In accordance with an aspect of an embodiment of the present invention, a method for multimedia file streaming in a receiving portable terminal is provided. The method includes determining meta data included in a received packet, generating new meta data having a circular-type media data offset on the basis of the meta data, storing media data included in the packet received in a circular manner according to the media data offset included in the new meta data, and loading the media data stored according to the media data offset included in the new meta data.

In accordance with another aspect of an embodiment of the present invention, a method for multimedia file streaming in a transmitting portable terminal is provided. The method includes determining meta data and media data by analyzing a multimedia file, transmitting the meta data to a receiving portable terminal by packetizing the meta data for streaming, and transmitting the media data by packetizing the media data for streaming.

In accordance with another aspect of an embodiment of the present invention, an apparatus for multimedia file streaming in a receiving portable terminal is provided. The apparatus includes a protocol processor for determining meta data included in a received packet, a file generator for generating new meta data having a circular-type media data offset on the basis of the meta data and for storing media data included in the packet received in a circular manner according to the media data offset included in the new meta data, and a streaming manager for loading the media data stored according to the media data offset included in the new meta data.

In accordance with another aspect of an embodiment of the present invention, an apparatus for multimedia file streaming in a transmitting portable terminal is provided. The apparatus includes a streaming manager for determining meta data and media data by analyzing a multimedia file, and a protocol processor for transmitting the meta data to a receiving portable terminal by packetizing the meta data for streaming and for transmitting the media data by packetizing the media data for streaming.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF EMBODIMENTS OF THE PRESENT INVENTION

Exemplary embodiments of the present invention will be described below with reference to the accompanying drawings. In the following description, well-known functions or constructions are not described in detail since they would obscure the invention in unnecessary detail.

Hereinafter, an apparatus and method for multimedia file streaming in a portable terminal will be described.

According to the present invention, meta data is processed to increase memory efficiency, and streaming is performed on desired contents by transmitting only necessary data at any reproduction time.

Figure 1:
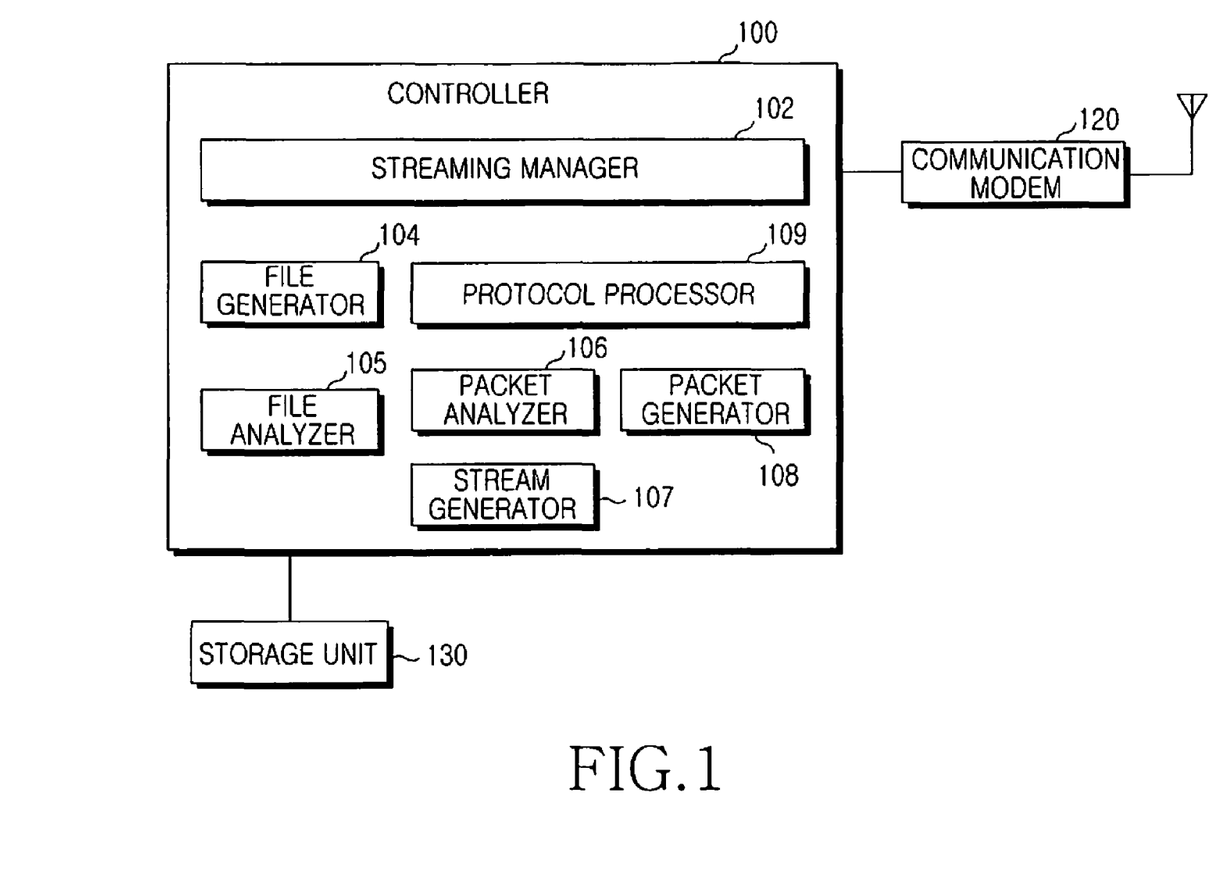
FIG. 1 is a block diagram illustrating a portable terminal according to an embodiment of the present invention.

FIG. 1 is a block diagram illustrating a portable terminal according to an embodiment of the present invention.

Referring to FIG. 1, the portable terminal includes a controller 100, a communication modem 120, and a storage unit 130.

The controller 100 includes a streaming manager 102, a file generator 104, a file analyzer 105, a protocol processor 109, a packet analyzer 106, a packet generator 108, and a stream generator 107.

The controller 100 controls an overall operation of the portable terminal. In particular, the controller 100 controls the functional modules 102 to 109 included in the controller 100 according to the present invention. However, in actual product implementation, all functions of the functional modules 102 to 109 may be processed by the controller 100, or only some of the functions may be processed by the controller 100.

The storage unit 130 performs a function of storing a program for controlling the overall operation of the portable terminal and temporary data generated in the process of executing the program. In particular, according to the present invention, if the portable terminal is used for the purpose of transmission, the storage unit 130 stores a multimedia file. Otherwise, if the portable terminal is used for the purpose of reception, the storage unit 130 stores meta data and media data which are determined by reconfiguring meta data and media data of an original multimedia file.

The communication modem 120 is a module for performing communication with another node, and includes a radio processor and a base-band processor. The radio processor converts a signal received through an antenna into a base-band signal and provides the base-band signal to the base-band processor. Further, the radio processor converts the base-band signal received from the base-band processor into a radio signal so that the received signal can be transmitted through an actual wireless path, and then transmits the radio signal through the antenna. However, when the communication modem 120 includes a function for wired communication, the communication modem 120 can perform a transmission/reception function through a wired path.

For communication between the portable terminals, the protocol processor 109, the packet generator 108, and the packet analyzer 106 are provided as a module for generating and analyzing a packet and for processing a protocol for the packet.

The file analyzer 105 performs a function of parsing a multimedia file, that is, a function of analyzing the multimedia file.

The stream generator 107 converts information of the parsed multimedia file provided by the file analyzer 105 into information for streaming and generates a specific unit sized payload included in the packet.

The packet analyzer 106 analyzes the packet upon receiving the packet. More specifically, the packet analyzer 106 parses a packet header.

For packet transmission, the packet generator 104 generates a header of the packet to be transmitted.

The protocol processor 109 processes a protocol which specifies transmission and reception of a packet including data or control information when the packet is transmitted.

The streaming manager 102 calls and operates each module related to streaming, and performs a function of regulating a data flow and controlling inter-working with an arbitrary application unit (or a reproduction unit).

The file generator 104 generates a reproduction file (i.e., media data) so that streaming can be performed without being restricted by the arbitrary application unit (or the reproduction unit) by using a memory capacity smaller than a size of an original large file (i.e., the multimedia file) in a receiving portable terminal.

Figure 2:
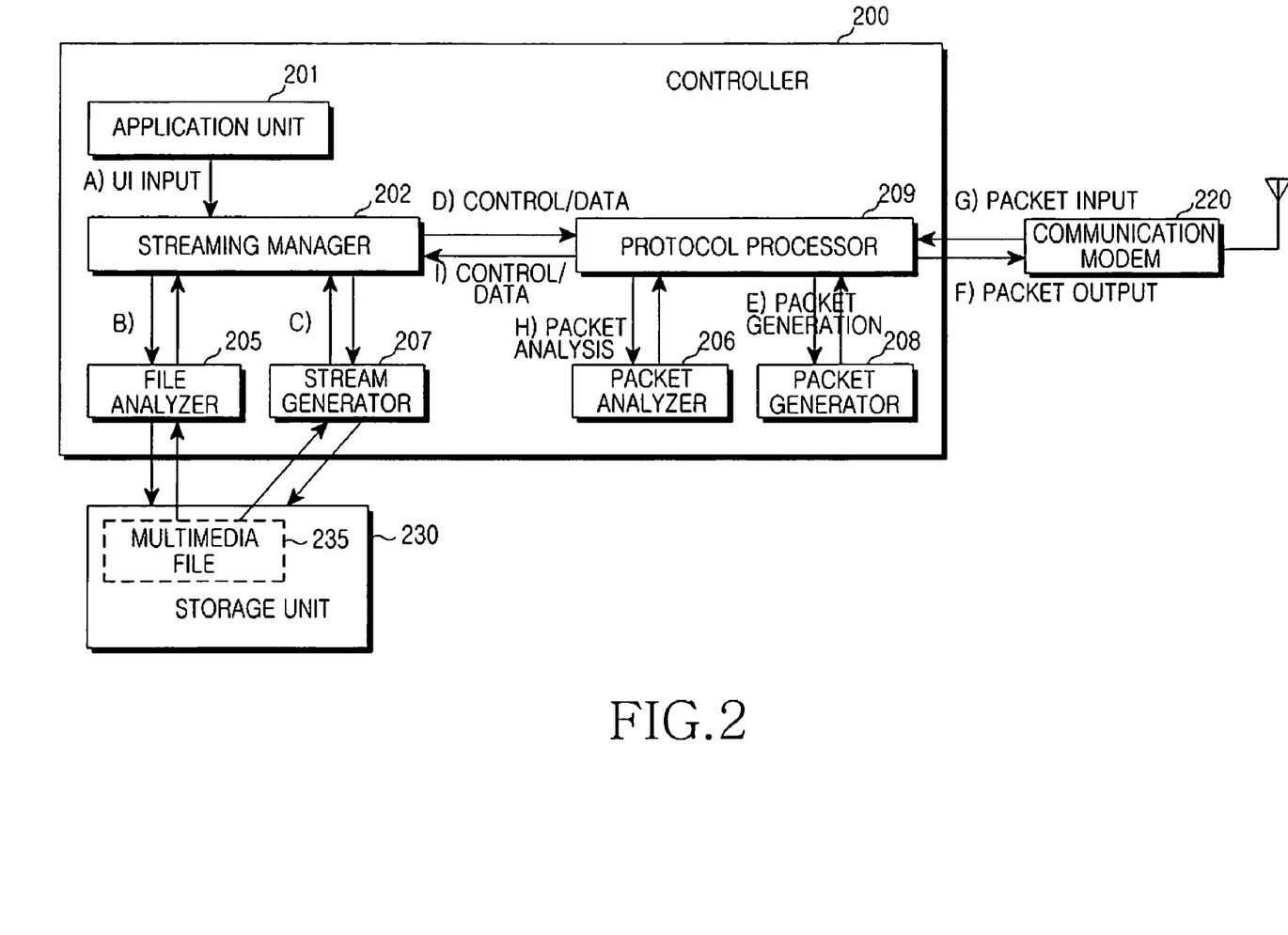
FIG. 2 is a block diagram illustrating a transmitting-side portable terminal and a transmission flow according to an embodiment of the present invention.

FIG. 2 is a block diagram illustrating a transmitting-side portable terminal and a transmission flow according to an exemplary embodiment of the present invention.

Referring to FIG. 2, functions of a file analyzer 205 and a stream generator 207 of the controller 200 of the transmitting-side portable terminal are important for streaming between portable terminals.

When an application unit 201 of the transmitting-side portable terminal starts a streaming function (e.g., when an event for driving a function occurs through a user interface) at step A, a streaming manager 202 performs functions described below by controlling the file analyzer 205 at step B and the stream generator 207 at step C.

In order to stream a multimedia file 235 between the portable terminals, the file analyzer 205 first has to parse the multimedia file 235. The multimedia file 235 includes meta data consisting of information required for file reproduction and media data which is actually compressed data. Herein, the multimedia file 235 is stored in a storage unit 230.

If the file is an MPEG-4 file, a media data atom represents the compressed media data and a movie atom represents the meta data.

The file analyzer 205 analyzes a format of the multimedia file 235 to determine the aforementioned media data and meta data. Further, the file analyzer 205 re-analyzes the meta data to determine basic information of a file required for streaming. The basic information may be length and location information of each atom, offset information of each data chunk, length information of each data sample, time information of media data, etc. Further, the file analyzer 205 provides the determined information to the streaming manager 202.

The stream generator 207 processes the media information analyzed by the file analyzer 205 into information for streaming, and generates the processed information into a specific unit sized payload included in a transmission packet.

The stream generator 207 loads media data from the multimedia file 235, and generates the loaded media file into a specific unit sized payload included in a transmission packet.

In the process of control message/data message exchange of a protocol processor 209 and the streaming manager 202 in steps D and I, stream information generated by the stream generator 207 is generated into a packet and is then transmitted in steps E and H.

As to the payload of the packet generated by the stream generator 207, a packet generator 208 finishes the packetization process by generating a packet header for the payload at step E. The generated packet is transmitted via the protocol processor 209 and a communication modem 220 in steps F and G. Step G is performed for protocol operation control or data message reception.

The media data is loaded on a chunk basis, and is transmitted on a packet basis together with the size and location information. The present invention provides the ability of resuming the last played multimedia file and the ability of streaming a multimedia file at a present reproduction position or any reproduction position. In this case, memory efficiency is high since data transmission is performed starting from data required for reproduction.

Among data parsed by the file analyzer 205, meta data is first transmitted and then media data is transmitted. This is because, in order for a receiving-side portable terminal to effectively perform real-time streaming, the meta data transmitted prior to the compressed media data is used to ensure a memory space required for a multimedia file to be played and to construct a reproduction environment, and thereafter streaming is actually performed when the compressed media data is transmitted in a regular manner.

More specifically, the transmission flow process shown in FIG. 2 is as follows. Upon sensing an event for driving a streaming service, the application unit 201 instructs the streaming manager 202 to drive a streaming service function at step A.

The streaming manager 202 instructs the file analyzer 205 to analyze the multimedia file 235 at step B. Further, on the basis of meta data information analyzed by the file analyzer 205, the streaming manager 202 instructs the stream generator 207 to determine media data for the multimedia file 235 and to generate the determined data into a payload of a transmission packet for streaming at step C.

The streaming manager 202 provides the protocol processor 209 with a payload including the generated meta data and media data at step D. The protocol processor 209 instructs the packet generator 208 to generate a packet header for the provided payload including the meta data and media data. The packet generator 208 generates the instructed packet header at step E.

The protocol processor 209 finishes the packet generation process by combining the packet header and the packet payload, and transmits the generated packet to the communication modem 220 at step F.

Thereafter, if a control message is received via the communication modem 220, the protocol processor 209 instructs a packet analyzer 206 to analyze the received control message at step H. Then, the protocol processor 209 receives the analysis result and provides the received analysis result to the streaming manager 202 at step I. The streaming manager 202 performs a defined operation on the basis of the analysis result. In this process, the protocol processor 209 may perform packet retransmission. The streaming manager 202 may also perform retransmission.

Figure 3:
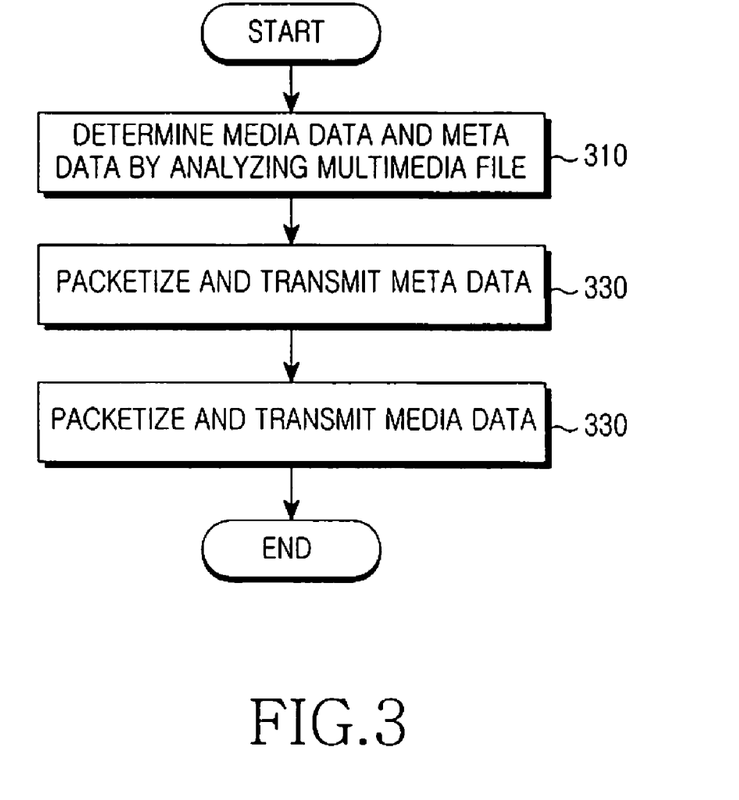
FIG. 3 is a flowchart illustrating a transmission process of a transmitting-side portable terminal according to an embodiment of the present invention.

FIG. 3 is a flowchart illustrating a transmission process of a transmitting-side portable terminal according to an embodiment of the present invention.

Referring to FIG. 3, the portable terminal analyzes a multimedia file to be streamed, and determines media data and meta data from the multimedia file at step 310. Thereafter, the meta data is packetized and transmitted at step 320, and the media data is packetized and transmitted at step 330.

Figure 4:
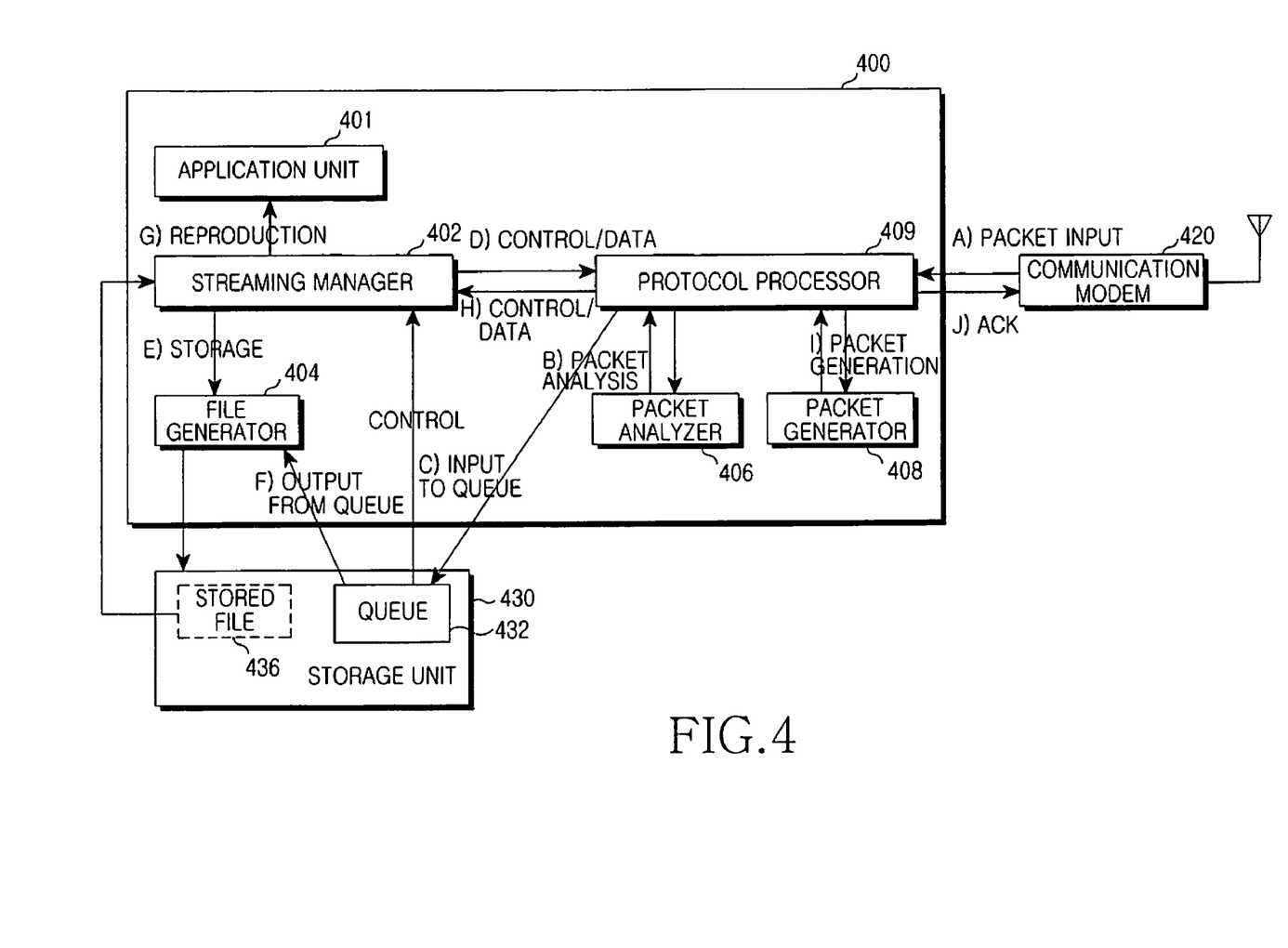
FIG. 4 is a block diagram illustrating a receiving-side portable terminal and a reception flow according to an embodiment of the present invention.

FIG. 4 is a block diagram illustrating a receiving-side portable terminal and a reception flow according to an embodiment of the present invention.

Referring to FIG. 4, functions of a file generator 404 of the controller 400 of the receiving-side portable terminal is important for streaming between portable terminals.

An application unit (or a reproduction unit) 401 loads meta data to play a multimedia file, and determines a variety of information on media by using the meta data. Thereafter, the application unit 401 starts reproduction while decoding compressed media data on the basis of the meta data information.

A protocol processor 409 receives a transmitted packet via a communication modem 420 at step A. For depacketizing, the protocol processor 409 instructs a packet analyzer 406 to parse a packet header.

In the process of control message/data message exchange of the protocol processor 409 and a streaming manager 402 at steps D and H, stream information (i.e., meta data and media data) included in a received packet is stored in a queue 432 of a storage unit 430.

The protocol processor 409 communicates with a packet generator 408 at step I when control/data transmission is performed via the communication modem 420 at step J, and communicates with the packet analyzer 406 at step B when control/data reception is performed via the streaming manager 402. Accordingly, streaming is smoothly performed. That is, by using a wireless communication protocol, the protocol processor 409 provides a function of receiving streaming data and transmitting a control message in response to the received streaming data.

The protocol processor 409 stores a payload (i.e., meta data or media data) provided by the packet analyzer 406 into the queue 432 located in the storage unit 430 at step C. The file generator 404 loads the meta data stored in the queue 432 at step F. Then, the meta data is processed to be generated into new meta data, and is then stored in the storage unit 430.

A file 436 is stored in the storage unit 430. In this manner, streaming can be performed without being affected by the arbitrary application unit (or the reproduction unit) 401 by using a memory capacity smaller than a size of an original large file. Such a storing process is performed under the control of the streaming manager 402 at step E.

The received meta data includes atom length and location information, offset information of each data chunk, length information of each data sample, and time information of media data. The file generator 404 first processes the offset information of each data chunk.

The file generator 404 processes the meta data to generate new meta data having new circular-type offset information. The compressed media data is sequentially provided according to a sequence of the completely generated new offset, and is then generated into a file.

Figure 6A:
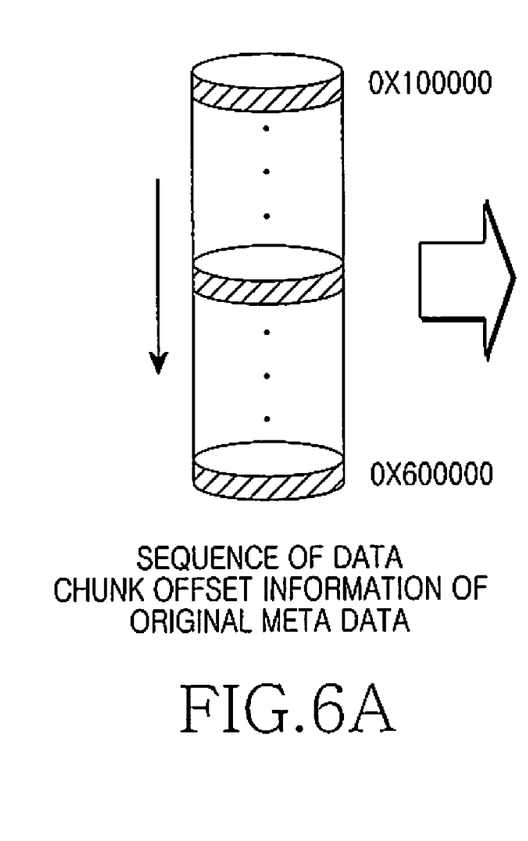
FIG. 6 illustrates a circular-type storage mechanism of a receiving-side portable terminal according to an embodiment of the present invention.
Figure 6B:
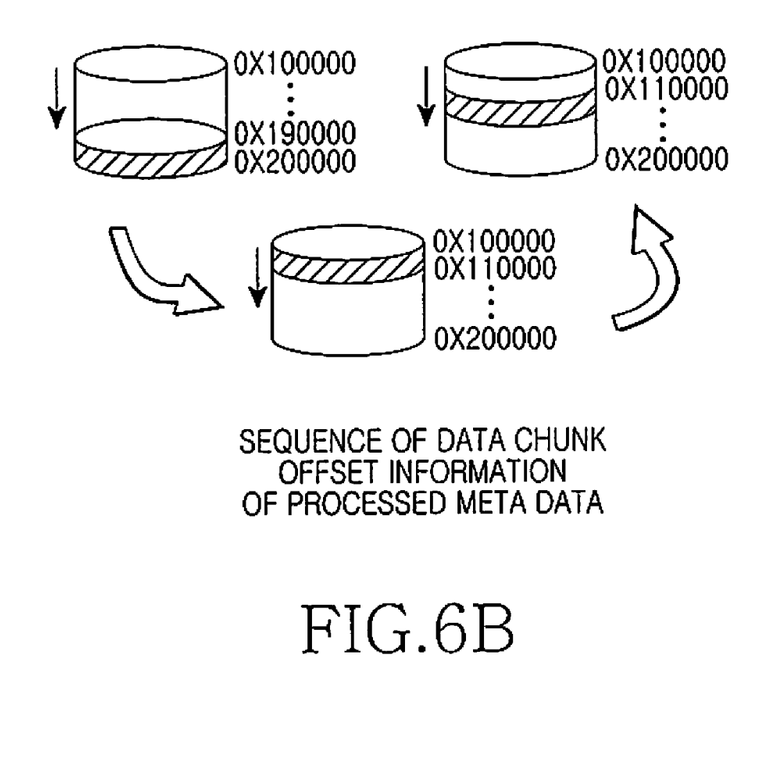

The file generator 404 stores a large file in a format of a small file. Thus, data chunk offset information which is sequentially incremented as illustrated in FIG. 6 is re-mapped in a circular manner. That is, as illustrated in FIG. 6B, the data chunk offset sequentially incremented starting from a first start position up to a specific memory size is re-mapped again to a first start position address at the end of the allocated memory, thereby sequentially incrementing a next data chunk offset. When re-mapping is achieved to the first start position address in a circular manner, previously stored data is flushed.

The streaming manager 402 performs a reproduction process on the basis of the meta data and media data provided from the protocol processor 409. The application unit (or the reproduction unit) 401 determines a bit-stream amount consumed per second according to a multimedia file bit-rate, and controls media data reproduction while avoiding overflow or underflow.

The streaming manager 402 collectively calls and operates each of the modules, and also controls inter-working with the application unit (or the reproduction unit) 401.

More specifically, the reception flow process shown in FIG. 4 is as follows. When a packet is received via the communication modem 420, the received packet is provided to the protocol processor 409 at step A. The protocol processor 409 instructs the packet analyzer 406 to analyze a header of the received packet. The packet analyzer 406 analyzes the header, and provides the analysis result to the protocol processor 409 at step B.

On the basis of the analysis result, the protocol processor 409 determines a payload from the packet, for example, when the analysis result is successful. The payload includes meta data and media data for the multimedia file.

Thereafter, the protocol processor 409 stores the meta data and the media data into the queue 432 of the storage unit 430 at step C, and provides information on the storing result to the streaming manager 402 at step D. The protocol processor 409 may store the media data into the queue 432 at step C, and may provide the meta data to the streaming manager 402 at step D.

The streaming manager 402 instructs the file generator 404 to generate new meta data and media data at step E. The file generator 404 generates the new meta data and loads the media data from the queue 432 at step F, and stores the loaded data into the storage unit 430 according to the new meta data. The new media data 436 is stored in the storage unit 430 in a circular manner as described above.

The streaming manager 402 loads the new media data from the storage unit 430 and provides the loaded data to the application unit 401 to perform a reproduction process at step G.

Thereafter, if receiving of a payload or processing of information included in the payload is successful (or unsuccessful), the streaming manager 402 provides a payload including control information indicating success or failure to the protocol processor 409 at step H.

The protocol processor 409 receives the payload including the control information, and if a control message needs to be transmitted to the transmitting-side portable terminal, instructs the packet generator 408 to generate a packet header at step I. The generated packet header is combined with a packet payload to complete a packet, and thereafter the packet is transmitted via the communication modem 420 at step J.

Figure 5:
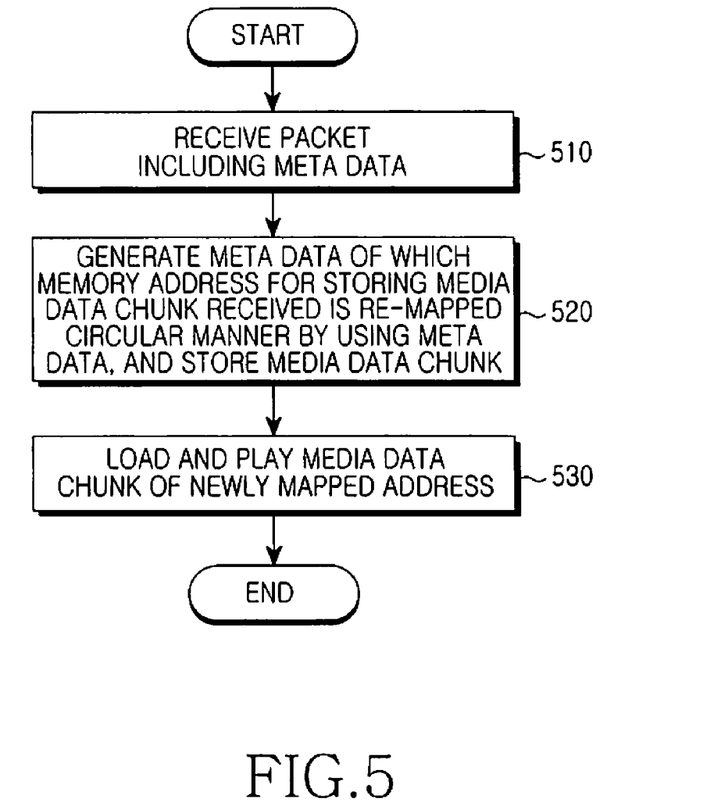
FIG. 5 is a flowchart illustrating a receiving process of a receiving-side portable terminal according to an embodiment of the present invention.

FIG. 5 is a flowchart illustrating a receiving process of a receiving-side portable terminal according to an embodiment of the present invention.

Referring to FIG. 5, the portable terminal receives a packet including meta data at step 510. The portable terminal uses the meta data to generate meta data of which a memory address for storing a media data chunk received at a later time is re-mapped in a circular manner, and stores the media data chunk received according to the meta data at step 520.

Thereafter, a media data chunk for a newly mapped address is played by using the generated new meta data at step S530.

According to exemplary embodiments of the present invention, there is an advantage in that real-time streaming can be performed by using a small-capacity memory without being restricted by a player designated for a specific terminal when multimedia file contents are streamed between portable terminals.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method for multimedia file streaming in a receiving portable terminal, the method comprising:
   determining meta data included in a received packet;
   generating new meta data having a circular-type media data offset on the basis of the meta data;
   storing media data included in the packet received in a circular manner according to the media data offset included in the new meta data; and
   loading the media data stored according to the media data offset included in the new meta data.

2. The method of claim 1, further comprising reproducing the loaded media data.

3. The method of claim 1, further comprising requesting the meta data or the media data again when the meta data or the media data has an error.

4. The method of claim 1, wherein storing the media data included in the packet comprises, when the media data is sequentially stored from a first start position to an end position in an allocated memory, storing next media data sequentially from the first start position.

5. An apparatus for multimedia file streaming in a receiving portable terminal, the apparatus comprising:
   a protocol processor for determining meta data included in a received packet;
   a file generator for generating new meta data having a circular-type media data offset based on the meta data and for storing media data included in the packet received in a circular manner according to the media data offset included in the new meta data; and
   a streaming manager for loading the media data stored according to the media data offset included in the new meta data.

6. The apparatus of claim 5, further comprising an application unit for reproducing the loaded media data.

7. The apparatus of claim 5, wherein the streaming manager requests the meta data or the media data again when the meta data or the media data has an error.

8. The apparatus of claim 5, wherein, when the media data is sequentially stored from a first start position to an end position in an allocated memory, the file generator stores next media data sequentially from the first start position.

* * * * *